US007544053B2

(12) United States Patent
Nguyen et al.

(10) Patent No.: US 7,544,053 B2
(45) Date of Patent: Jun. 9, 2009

(54) FLEXIBLE MOLDING DEVICE FOR MANUFACTURING A SUNKEN GROOVE OR SURFACE TIE BAR IN A TIRE TREAD

(75) Inventors: Gia-Van Nguyen, Blagny (FR); Alain Emile Francois Roesgen, Asselborn (LU); Peter Phelps Roch, Ettelbruck (LU); Anne-France Gabrielle Jeanne-Marie Cambron, Mersch (LU); Yacine Ouyahia, Bereldange (LU); Yvan Sac, Nachtmanderscheid (LU); Francis Bartholome, Libramont (BE); Gerard Louis Marie Schmit, Attert (BE); Joel Andre Ghislain Delogne, Neufchateau (BE); Guy Jacobs, Holzthum (LU); Raymond Marie Joseph Ghislain Houba, Vaux-sur-sure (BE); Bernard Marie Henin, Latour (BE)

(73) Assignee: The Goodyear Tire and Rubber Company, Akron, OH (US)

( * ) Notice: Subject to any disclaimer, the term of this patent is extended or adjusted under 35 U.S.C. 154(b) by 73 days.

(21) Appl. No.: 11/891,970

(22) Filed: Aug. 14, 2007

(65) Prior Publication Data

US 2008/0152740 A1 Jun. 26, 2008

Related U.S. Application Data

(60) Provisional application No. 60/876,210, filed on Dec. 21, 2006.

(51) Int. Cl.
*B29D 30/00* (2006.01)

(52) U.S. Cl. ............................ 425/3; 425/28.1; 425/37; 425/438; 425/DIG. 58

(58) Field of Classification Search ..................... 425/3, 425/28.1, 35, 37, 46, 438, 470, 472, DIG. 58
See application file for complete search history.

(56) References Cited

U.S. PATENT DOCUMENTS 2,770,013 A 11/1956 Crooker ......................... 18/36

(Continued)

FOREIGN PATENT DOCUMENTS

DE 1274799 8/1968

(Continued)

OTHER PUBLICATIONS

European Search Report completed Mar. 10, 2008.

*Primary Examiner*—James Mackey
(74) *Attorney, Agent, or Firm*—June E. Rickey

(57) ABSTRACT

A tire mold and a molding device for forming a sunken groove in a tire are provided. The molding device includes one or more rigid elements joined to a flexible member. The flexible member is formed from a flexible material, preferably a superalloy, or hyperelastic material. The molding device may further comprise a magnet. A portion of the flexible member is positioned in contact with a first surface of a relief forming element of a mold and the rigid element has a mating surface in mating contact with a second surface of the relief forming element. The mold further may further comprise a second relief forming element positioned adjacent the first relief forming element, wherein the rigid element further includes an outer surface in mating contact with a surface of said second relief forming element.

8 Claims, 10 Drawing Sheets

10 2 11 22 24 13 24 5 12 36 3 34 38

U.S. PATENT DOCUMENTS 5,075,067 A * 12/1991 Rockarts et al. ............ 425/28.1
5,095,963 A * 3/1992 Maitre .................. 152/209.18
5,843,326 A * 12/1998 Bellot ........................ 249/104
6,143,223 A 11/2000 Merino Lopez ............. 264/219
6,193,492 B1 2/2001 Lagnier et al. ............. 425/28.1
6,408,910 B1 6/2002 Lagnier et al. ......... 152/209.17
6,767,495 B2 7/2004 Aperce et al. ............... 264/326
7,338,269 B2 * 3/2008 Delbet et al. .................. 425/37
2002/0134202 A1 * 9/2002 Domange et al. .......... 76/101.1
2003/0201048 A1 10/2003 Radulescu et al. ..... 152/209.52
2006/0137793 A1 6/2006 Nguyen et al. ......... 152/209.18
2006/0137794 A1 6/2006 Nguyen et al. ......... 152/209.22
2006/0144491 A1 7/2006 Nguyen et al. ......... 152/209.18
2006/0144492 A1 7/2006 Nguyen et al. ......... 152/209.23

FOREIGN PATENT DOCUMENTS

EP 0 450 251 B1 9/1996
EP 1243390 A2 9/2002
EP 1275527 A2 1/2003
EP 1586438 A1 10/2005
EP 1676695 A2 7/2006
WO 99/21701 5/1999

* cited by examiner

FLEXIBLE MOLDING DEVICE FOR MANUFACTURING A SUNKEN GROOVE OR SURFACE TIE BAR IN A TIRE TREAD

This application claims the benefit of, and incorporates by reference, U.S. Provisional Application No. 60/876,210 filed Dec. 21, 2006.

FIELD OF THE INVENTION

The present invention relates to the molding of tires, and in particular, the molding of treads for a tire.

BACKGROUND OF THE INVENTION

The tread elements in relief on a tire tread, such as the sipes, tread blocks and grooves, play a fundamental role in tire traction or adhesion to the road both in the transverse direction and in the circumferential direction. Traction is especially critical when travelling on wet or snowy roads. For wet conditions, the grooves act as evacuation channels for trapping and evacuating water to allow the tread blocks to be in contact with the road. In addition, surface tie bars are beneficial when the tire is new, and help to ensure good handling performance.

As a tire wears, the volume of the tread decreases due to frictional contact with the road surface. As the tire wears, the volume of the tire grooves decrease. As the tire wears, it is desired that the tire bar wears as well, since the tread block height is reduced and the tie bar is no longer necessary. Eventually the tire will require replacement.

It is known in the prior art to attempt to solve the degrading tread condition through the use of sunken grooves. The sunken grooves, due to a limitation in manufacturing, are generally oriented perpendicular to the shoulder region. Molding elements are typically used to form the sunken grooves, and they are often difficult to remove from the tire once the tire has been cured. To make a sunken groove, the mold elements need to be rigid enough to penetrate the uncured or green rubber tread, but flexible enough to be extracted from the cured tire without damaging the tire. Another requirement is that the sunken groove needs to be large and thick enough to be efficient, which leads to a molding element so stiff that its extraction would damage the tire tread or the element itself would fail by a fatigue fracture. Thus it is desired to have a method and apparatus of forming sunk grooves and surface tie bars that do not have the disadvantages described above.

SUMMARY OF THE INVENTION

A mold and molding device for forming a sunken groove or a surface tie bar in a tire tread is provided. The molding device includes one or more rigid elements joined to a flexible member. The flexible member is formed from a flexible material, preferably a superalloy, or hyperelastic material. The molding device may further comprise a magnet. A portion of the flexible member is positioned in contact with a first surface of a relief forming element of a mold and the rigid element has a mating surface in mating contact with a second surface of the relief forming element. The mold further may further comprise a second relief forming element positioned adjacent the first relief forming element, wherein the rigid element further includes an outer surface in mating contact with a surface of said second relief forming element.

BRIEF DESCRIPTION OF THE DRAWINGS

The invention will be described by way of example and with reference to the accompanying drawings in which.

DETAILED DESCRIPTION OF THE INVENTION

Figure 1:
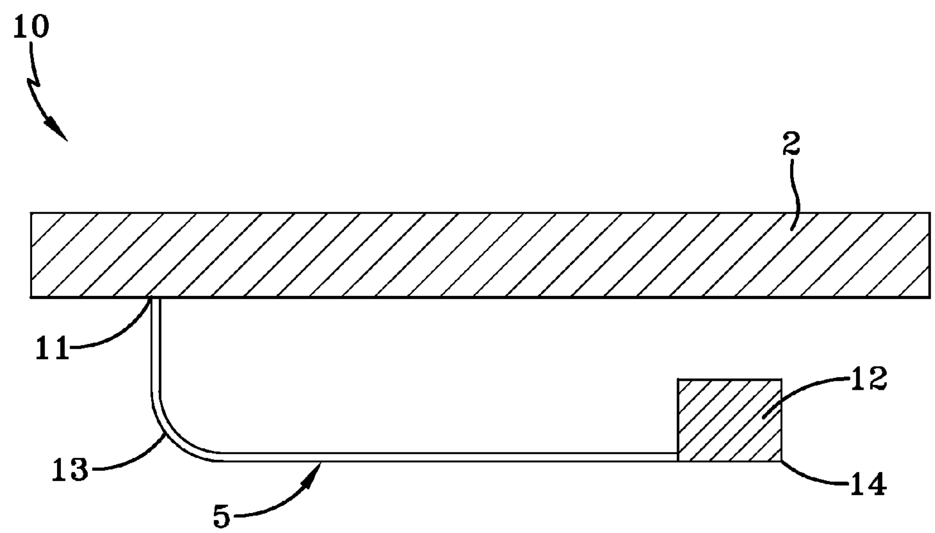
FIG. 1 is a schematic of a side view of a molding device for molding a sunken grooves and surface tie bar.

FIG. 1 illustrates a first embodiment of a molding device 10 suitable for molding sunken grooves or surface tie bars in a tire tread. A sunken groove is an elongate void area disposed underneath the new tread surface of a tire that is not visible when the tire is new, and that as the tire tread is worn during service, the sunken groove is exposed. The sunken groove may be disposed under a surface tire bar that is exposed when the surface tire bar wears away.

The molding device 10 includes a flexible member 5 having a distal end 11, an optional midsection 13 and one or more molding elements 12 located at a second end 14. The distal end 11 may be mounted to a portion 2 of a tire mold in any desired orientation for forming sunken grooves. The element 12 may be any desired size, but for example, may be about 1-10 mm long, preferably about 4-10 mm long, about 1-4 mm tall, preferably 2-4 mm, and about 5-8 mm deep, preferably 6-8 mm. The element 12 may have any desired cross-sectional shape, such as square or rectangular blocks 12. However, the element 12 is not limited to a block shape, and may be curved or have a rounded cross-sectional shape. The depth and thickness of the element 12 may vary. In addition, the longitudinal axis of the molding device 10 need not be linear, and may be nonlinear for example, curvilinear in shape or any other desired shape.

The element 12 is made of a rigid material such as metal, for example, steel, aluminum or any other suitable material. The element 12 may also be made of a rigid polymer or sintered material.

The flexible member 5 may be made of metal or any suitable flexible material known by those skilled in the art to be suitable for use in a mold. All or only a portion of the flexible member 5 may comprise elastic, very highly elastic, hyperelastic or superelastic materials such as shape memory alloys including, but not limited to, Nickel-Titanium alloys, CuZnAl, CuAlNi and CuAlBe. It is preferred that the flexible member 5 have an elastic limit greater than or equal to about 5% elongation, and more preferably greater than or equal to 10%.

The molding device 10 as described above may be formed of discrete elements 5, 12 assembled together, or formed as one integral unit such as by electro-erosion cutting. The elements 5, 12 may be connected together or connected via an intermediary member. The element 12 may be coated with a low friction material or have an optional low friction, protective layer (not shown) covering the element 12

Figure 2:
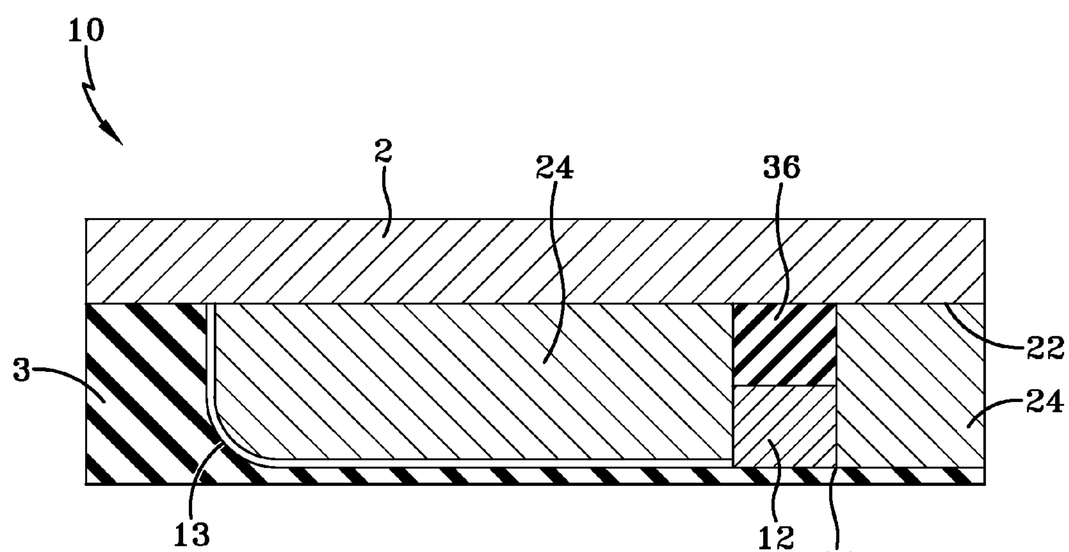
FIG. 2 is a is a side view of the molding device of FIG. 1 shown in use together in a tire mold.
Figure 3:
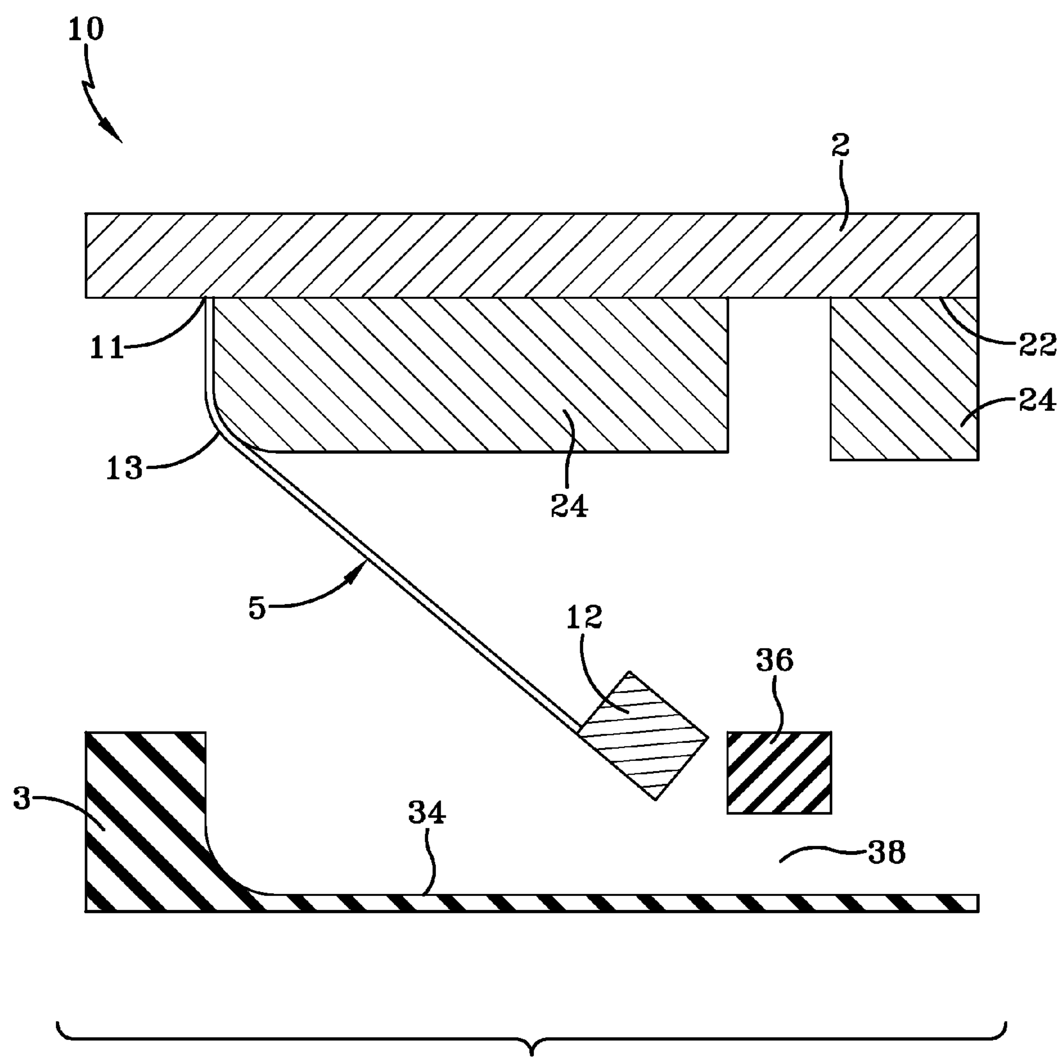
FIG. 3 is a schematic of a side view of the molding device of FIG. 2 during extraction from the tire mold.

FIG. 2 illustrates one example of the molding device 10 shown in use with an upper portion of a tire mold 2. The molding device 10 is embedded in the green tire tread 3 prior to cure. The molding device 10 may be mounted to in any desired orientation to the tire mold 2, so that for example, the sunken groove may be oriented circumferentially, axially or any other desired configuration. The molding device may be mounted in the segments of the mold corresponding to the crown portion of the tread or located in the portions of the mold corresponding to the sidewalls. The tire mold 2 has an inner surface 22 having relief elements 24 for forming a respective groove 34 in a tire tread. The molding device 10 is preferably mounted adjacent a relief element 24 to allow extraction of the molding device 10 from the groove. Preferably, the molding element 12 is located adjacent and in contact with relief element 24 to provide structural support for the molding device 10 as it enters the green tire prior to vulcanization. It is preferred that the flexible member has a preformed bend 13 to match the outer shape of the relief element 24. When the molding device is extracted from the cured tread 3, a surface tie bar 36 and a sunken groove portion 38 is formed.

Figure 4:
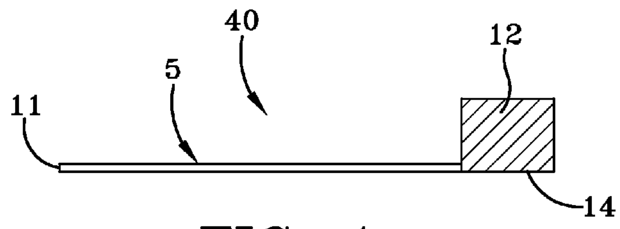
FIG. 4 is a schematic of side view of a second embodiment of a molding device.
Figure 5A:
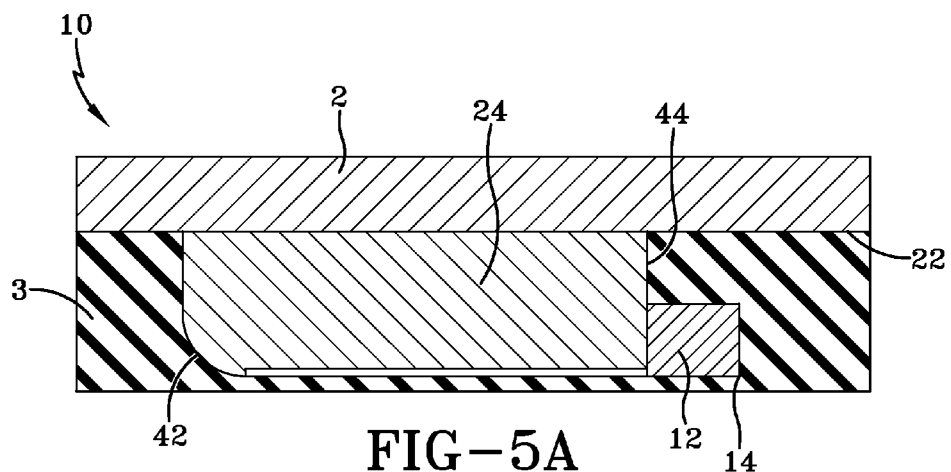
FIGS. 5A and 5B are side views of the molding device of FIG. 4 shown in use together in a portion of a tire mold during vulcanization of a green tire.
Figure 5B:
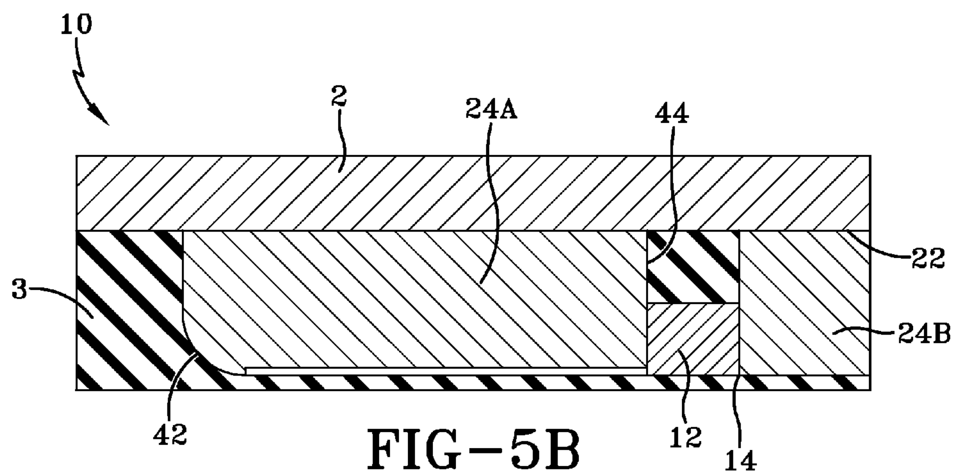
Figure 6A:
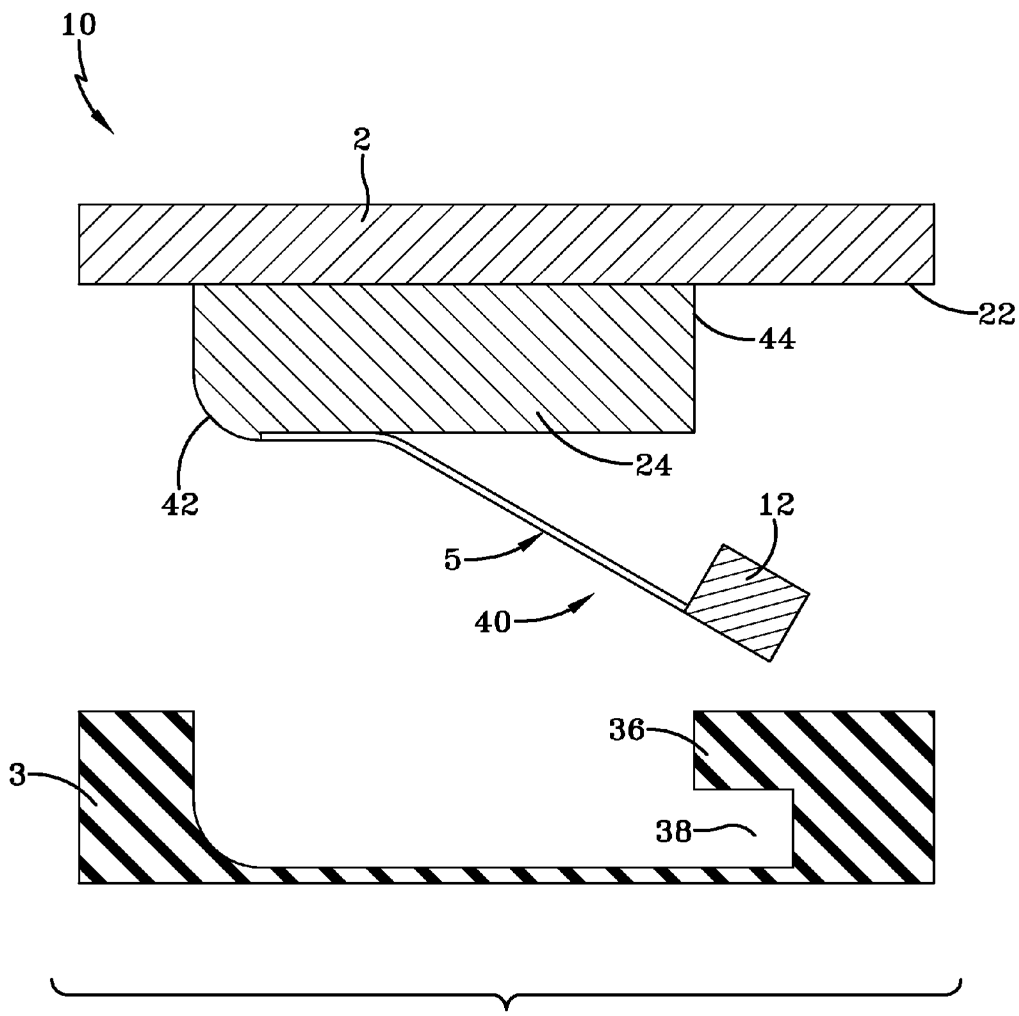
FIGS. 6A and 6B illustrate the molding device being extracted from a portion of a cured tire tread.
Figure 6B:
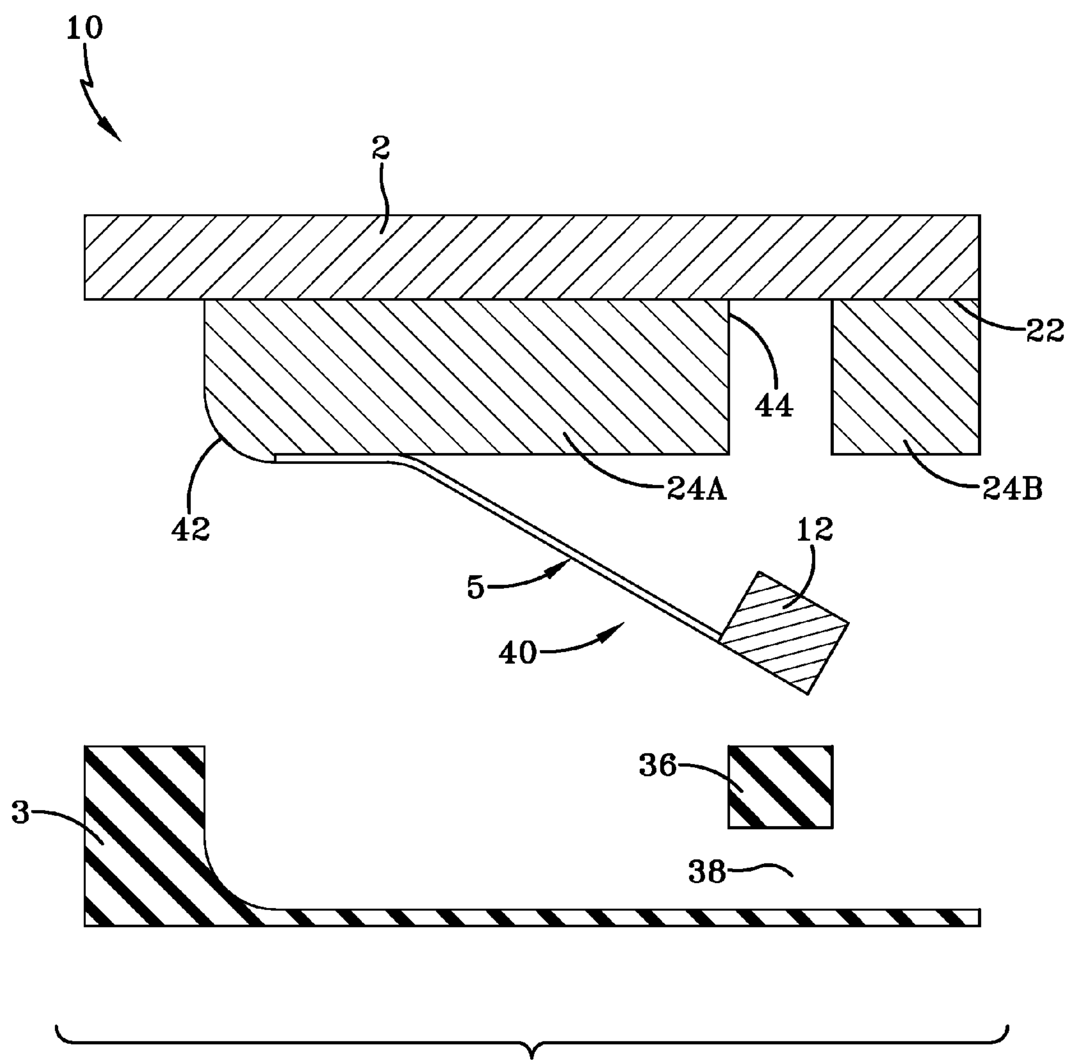
Figure 7A:
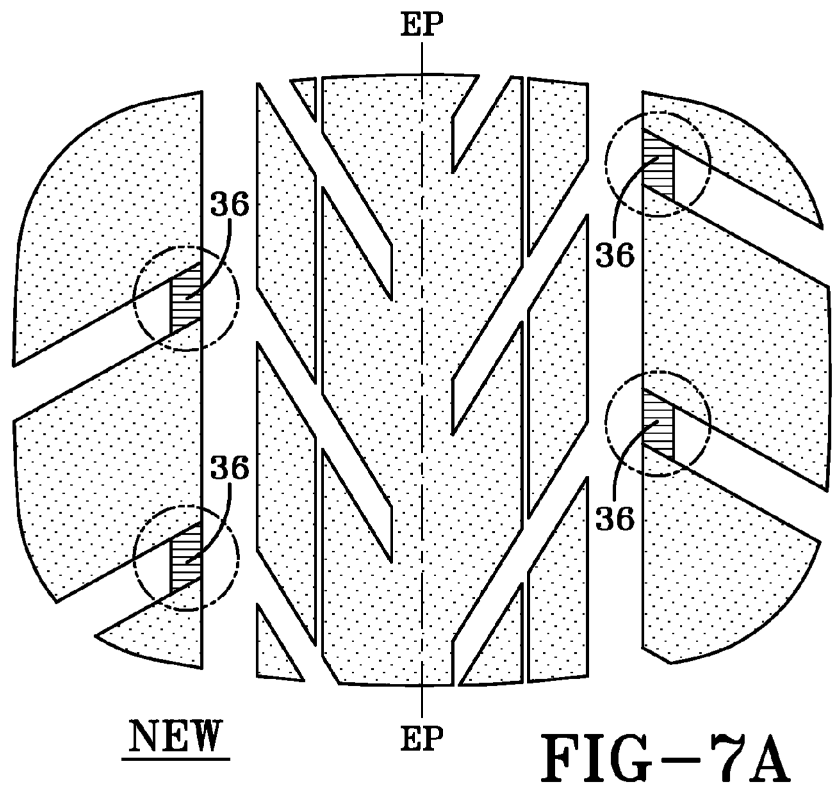
FIGS. 7A and 8A illustrate a new tire tread wherein the circled portions illustrate different orientations of a raised tie bar.
Figure 7B:
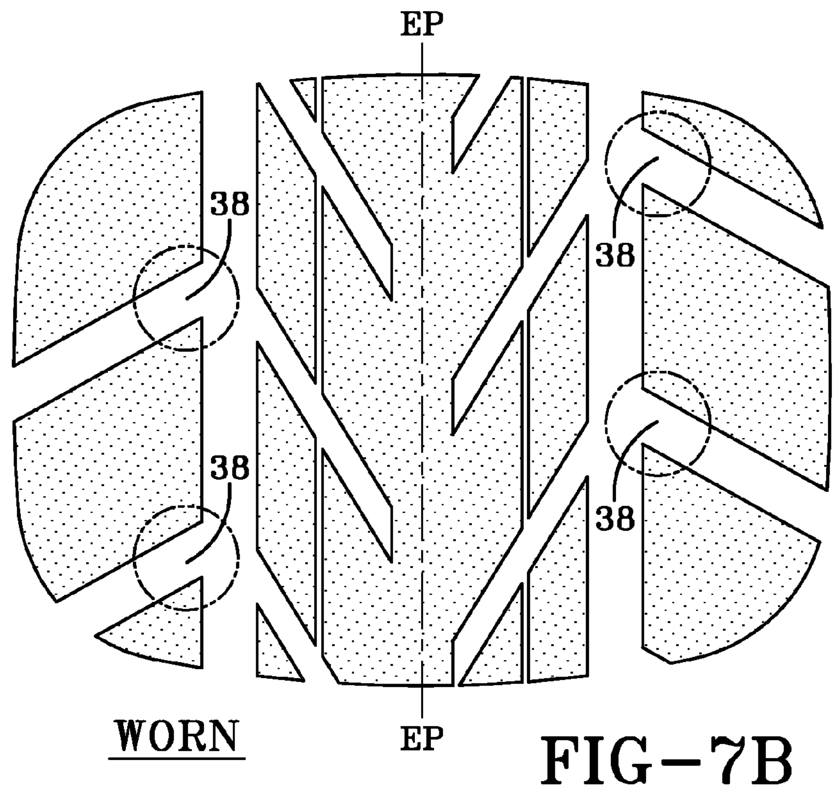
FIGS. 7B and 8B illustrate a worn tread wherein the circled portion illustrates the sunken groove now exposed due to wear.
Figure 8A:
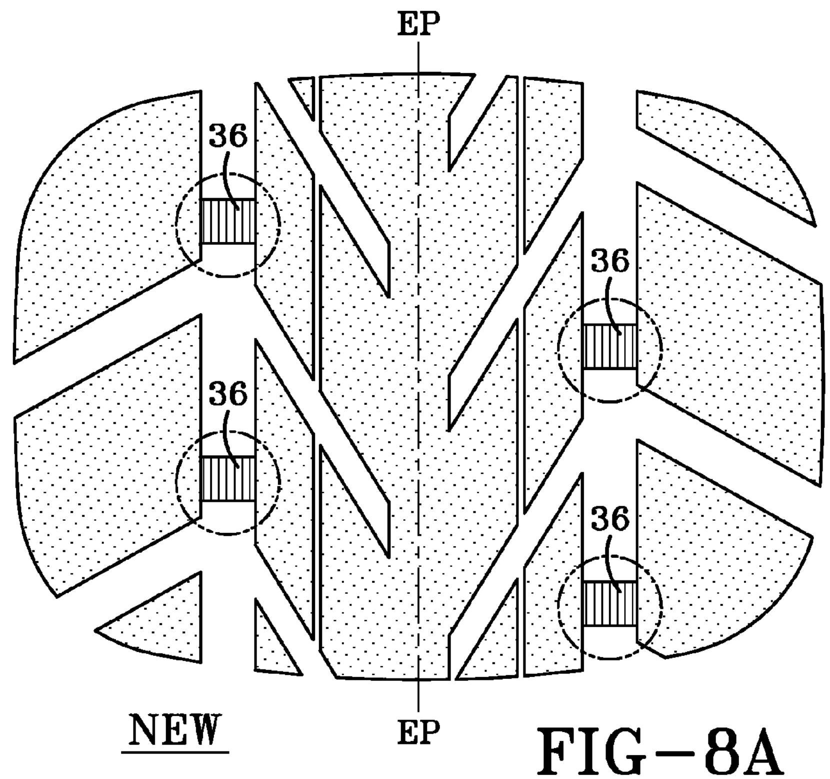
Figure 8B:
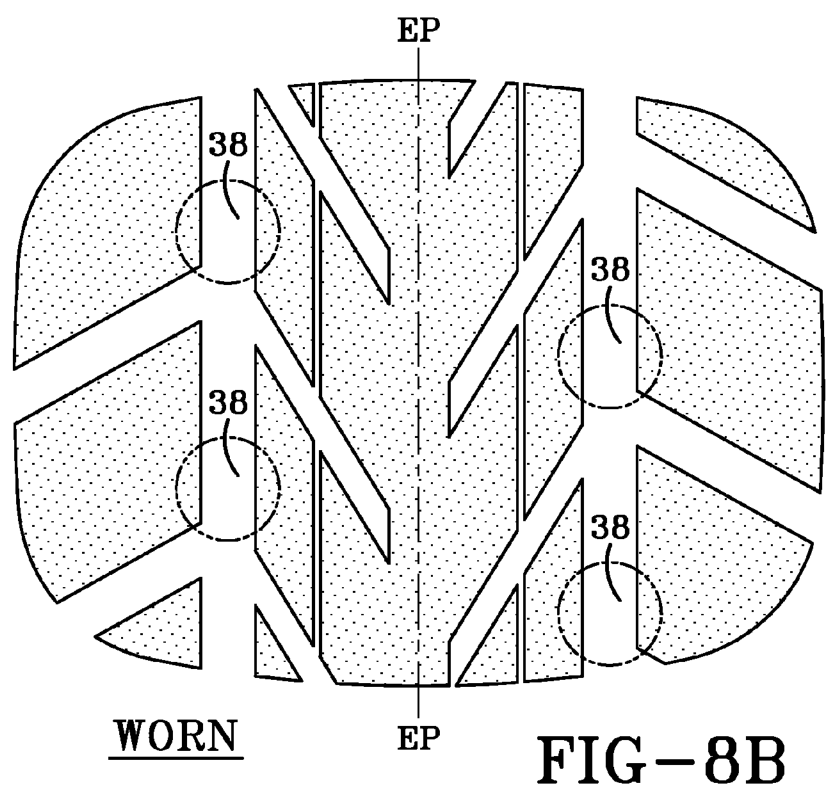

FIG. 4 is a second embodiment of a molding device 40 which is the same as the molding device 10, except that the flexible member 5 is straight. FIG. 5A illustrates the molding device 40 mounted to the lower surface 42 of the relief element 24 and wherein the sidewall 44 of the relief element 24 is in contact with the sidewall of the molding element 12. The relief element provides structural support to the molding device during insertion into the green tire prior to cure. FIG. 5B is the same as FIG. 5A, except an additional relief element 24 is preferably used so that both sidewalls of the molding element 12 are engaged with opposed walls of relief elements 24A and 24B. FIGS. 6A and 6B illustrate the molding device 40 shown in FIGS. 5A and 5B, respectively, after extraction from the green tire. A surface tie bar 36 and lower sunken groove 38 is formed when the molding device is removed from the cured tire. FIGS. 7A and 8A illustrate a new tire tread wherein the circled portion illustrates the surface tire bars 36, which may be oriented in the circumferential direction or the axial direction. FIGS. 7B and 8B illustrate a worn tire tread wherein the circled portions illustrate the portion of the tread revealing new grooves 38 which may be oriented in the circumferential or the axial direction.

Figure 9:
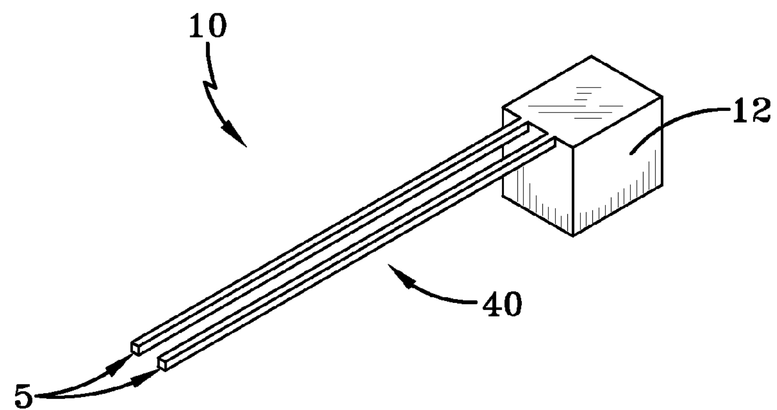
FIG. 9 is a third embodiment of a molding device.

FIG. 9 illustrates a third embodiment of the molding device 10, 40 wherein the molding device 10 is as described above, except that the molding device has two or more flexible members 5.

Figure 10:
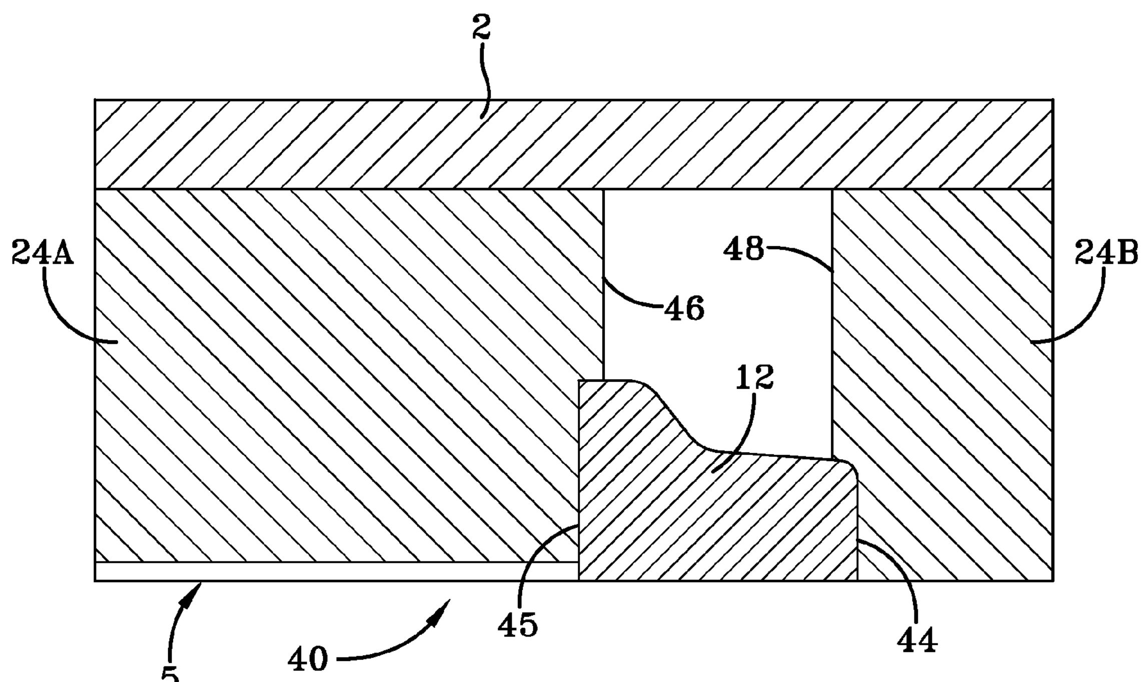
FIG. 10 is a fourth embodiment of a mold and a molding device.
Figure 11:
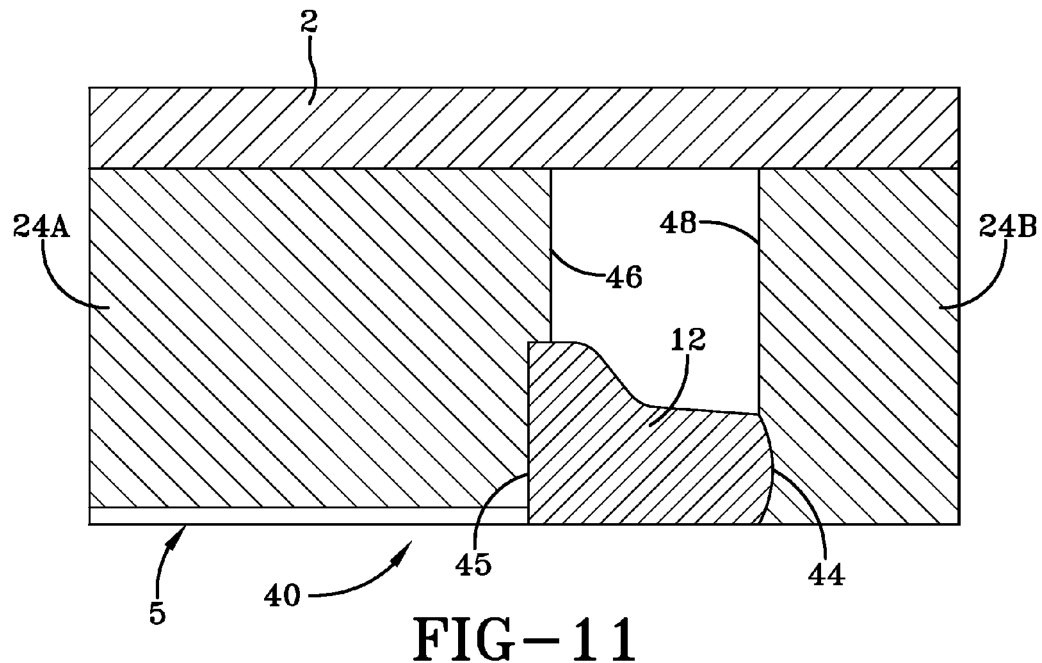
FIG. 11 is a fifth embodiment of a mold and a molding device.
Figure 12:
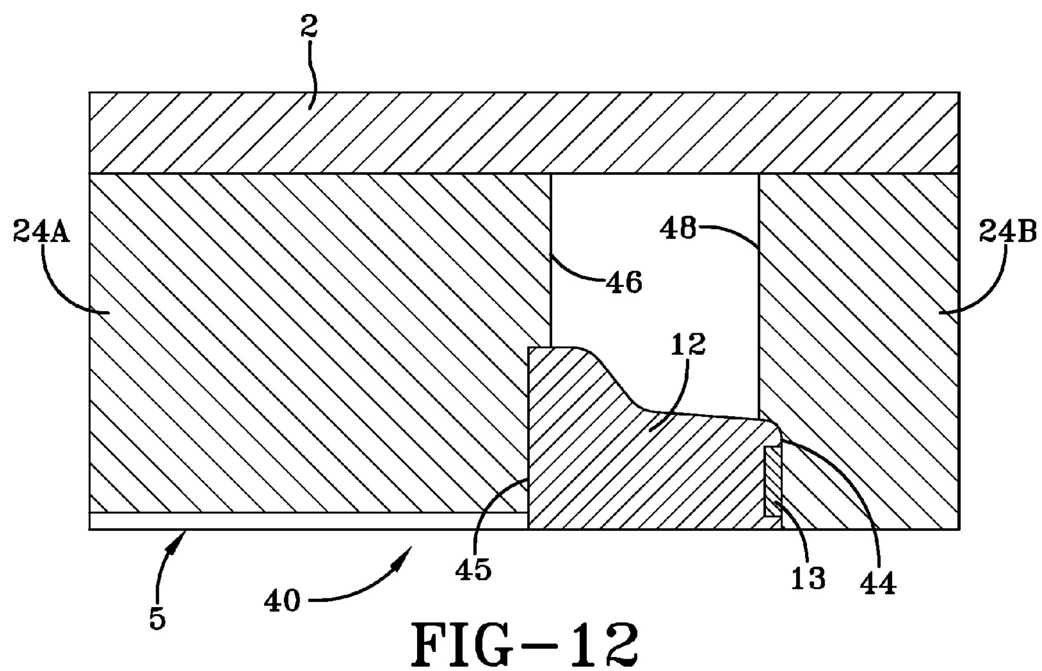
FIG. 12 is a sixth embodiment of a mold and a molding device.
Figure 13:
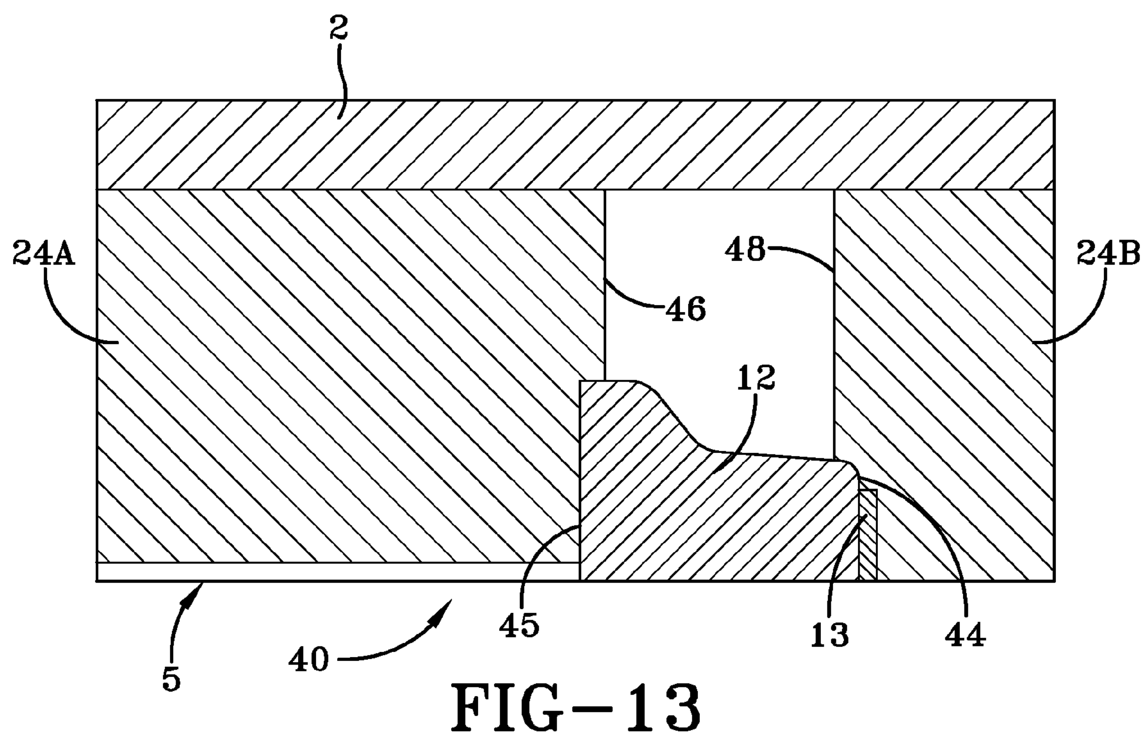
FIG. 13 is a seventh embodiment of a mold and a molding device.

FIG. 10 illustrates a fourth embodiment of the molding device 10/40 wherein the upper portion of the mold 2 has two groove forming elements 24A and 24B which are located adjacent each other. The molding device 10/40 is positioned such that the molding element 12 has endwalls 45, 44 which abut with opposed walls 46, 48 of the groove forming elements 24A, B. Preferably, the molding element endwall 44 is conical in shape to interlock with groove forming element 24B (see FIG. 11). More preferably, the molding element 12 has a magnet for ensuring contact with the groove forming element 24B (see FIG. 12). Alternatively, the magnet may be located in the groove forming element 24B (see FIG. 13).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A mold for molding a tread band of a tire, the tread band being made of an elastomer compound, the mold comprising a mold surface for molding the tread and a molding device projecting from the mold surface so as to become embedded in the elastomer compound to be molded, wherein the molding device comprises a rigid element and a flexible member, wherein the rigid element is connected to the flexible member, and wherein the mold has a relief forming element, and wherein a portion of the flexible member is positioned in contact with a first surface of the relief forming element and the rigid element has a mating surface in mating contact with a second surface of the relief forming element.

2. The mold of claim 1 wherein the flexible member is formed from a superelastic alloy.

3. The mold of claim 1 wherein the flexible member is formed from a material having an elastic limit greater than or equal to 5% elongation.

4. The mold of claim 1 wherein the flexible member is formed from a material having an elastic limit greater than or equal to 10% elongation.

5. The mold of claim 1 wherein the mold further comprises a second relief forming element positioned adjacent said first relief forming element, wherein the rigid element includes an outer surface in mating contact with a surface of said second relief forming element.

6. The mold of claim 1 wherein the molding rigid element further comprises a magnet.

7. The mold of claim 5 wherein the outer surface of the rigid element is conical in shape for interlocking with the surface of said second relief forming element.

8. The mold of claim 5 wherein the surface of said second relief forming element has a magnet for engaging the molding device.

* * * * *